United States Patent
Dombeck

[15] 3,662,863
[45] May 16, 1972

[54] BRAKE LINING WEAR INDICATOR
[72] Inventor: Edward K. Dombeck, South Bend, Ind.
[73] Assignee: The Bendix Corporation
[22] Filed: Oct. 29, 1970
[21] Appl. No.: 85,048

Related U.S. Application Data
[62] Division of Ser. No. 777,762, Nov. 21, 1968, Pat. No. 3,556,046.

[52] U.S. Cl................................188/1 A, 116/114 Q
[51] Int. Cl.............................................F16d 66/02
[58] Field of Search............116/67 R, 114 Q, 114 A, 114 E; 188/1 A

[56] References Cited
UNITED STATES PATENTS 3,381,653  5/1968  Rike...................188/1 A X
3,385,256  5/1968  Forbush................188/1 A X

*Primary Examiner*—Duane A. Reger
*Attorney*—Ken C. Decker and Plante, Hartz, Smith and Thompson

[57] ABSTRACT

This invention relates to a device providing a warning signal to the vehicle operator when the brake lining has worn a predetermined amount. The signal device comprises a weight which is released after brake lining wear to engage the brake assembly for an audible signal.

5 Claims, 8 Drawing Figures

PATENTED MAY 16 1972 3,662,863

INVENTOR.
EDWARD K. DOMBECK
BY
Plante, Hartz, Smith &
Thompson
ATTORNEYS

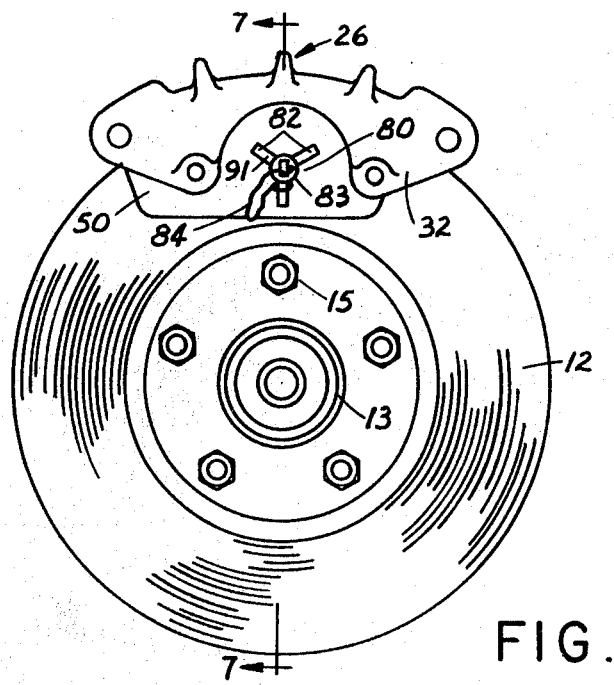
FIG. 6
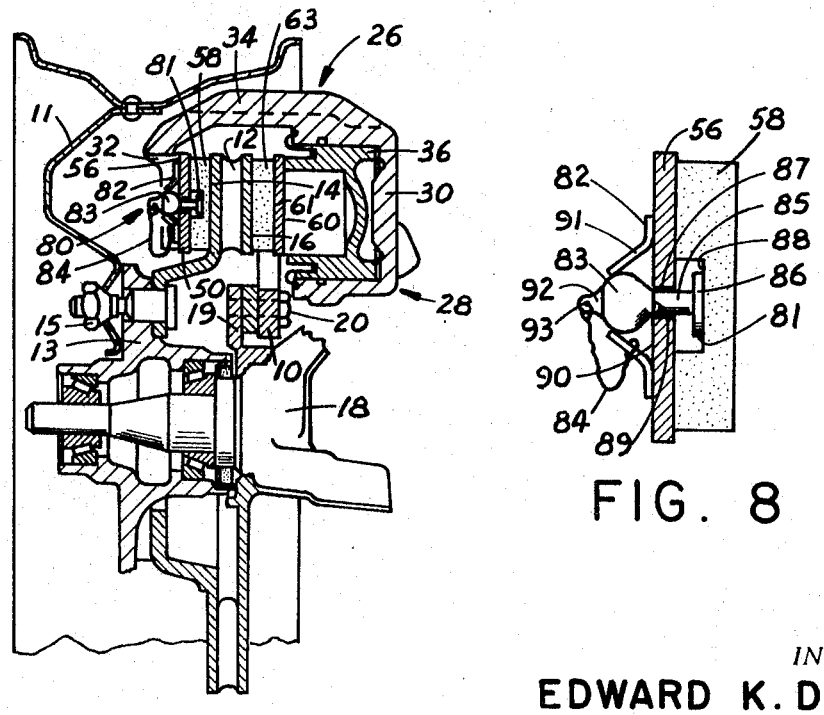
FIG. 7
FIG. 8
INVENTOR.
EDWARD K. DOMBECK
BY
Plante, Hartz, Smith &
Thompson
ATTORNEYS

BRAKE LINING WEAR INDICATOR

BACKGROUND OF THE INVENTION

This application is a division of application Ser. No. 777,762 filed Nov. 21, 1968, now U.S. Pat. No. 3,556,046.

At the present time, the inspection of the condition of brake linings requires that the brake structure be disassembled in order to make the examination directly, and in the case of automobiles this requires the relatively laborious process of jacking up the car and removing the wheels, and then reversing these steps after the inspection is complete. While this procedure is merely inconvenient in the case where the brake linings are in a private or pleasure automobile, in commercial vehicles, such as trucks, taxi cabs, buses, off-the-road vehicles and the like, where there is a necessity for a continuous inspection or preventive maintenance program, this process is laborious, time consuming, inefficient and costly.

Many devices have been developed in the past to provide some type of signal to a vehicle operator to inform him that brake lining wear has progressed a predetermined amount. However, these devices have generally been sophisticated, bulky and very expensive to manufacture and install in vehicles. Moreover, the operational reliability of these devices has not been entirely satisfactory, and thus, their anticipated widespread use has never materialized.

SUMMARY OF THE INVENTION

It is an object of this invention to provide a brake lining wear indicator that does not require the brake structure to be disassembled to determine if the linings are worn to the point that they need replacing.

It is an object of this invention to provide a brake lining wear indicator that does not interfere with normal operation of the brake.

It is an object of this invention to provide an immediate indication when the brake linings reach a point of wear which requires replacement.

It is an object of this invention to provide a brake lining wear indicator that is compact, easy to manufacture and install, and reasonably priced.

It is an object of this invention to provide a brake lining wear indicator that has operational reliability of a level heretofore unattainable.

It is an object of this invention to provide a brake lining wear indicator that after a predetermined amount of lining wear provides a visual indication to warn that said lining is in need of replacement.

It is an object of this invention to provide a brake lining wear indicator that after a predetermined amount of lining wear provides an audible indication to warn that said lining is in need of replacement.

Other objects and features of the invention will be apparent from the following description of the brake lining wear indicator taken in connection with the accompanying drawings.

BRIEF DESCRIPTION OF THE DRAWINGS

FIG. 6 is an elevation view of a brake constructed in accordance with the modified embodiment of this invention;

FIG. 7 is a sectional view taken substantially along line 7—7 of FIG. 6 and further including a vehicle wheel; and FIG. 8 is an enlarged view of the wear indicator means of the modified embodiment.

DESCRIPTION OF THE PREFERRED EMBODIMENTS

Figure 1:
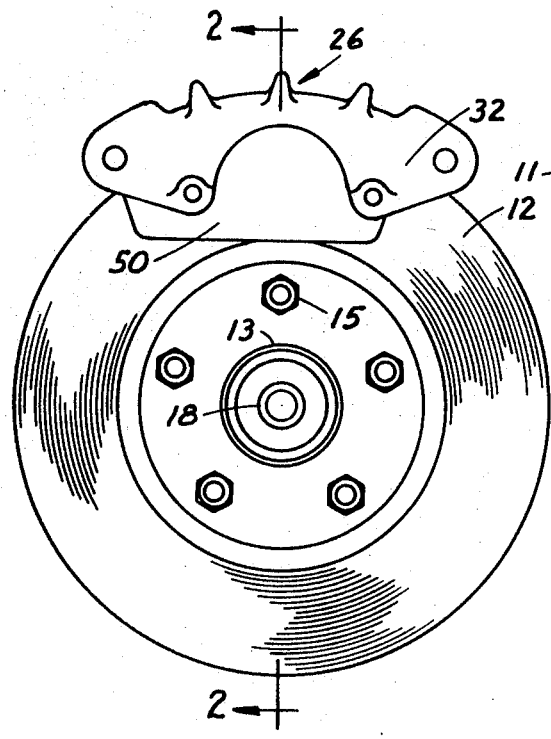
FIG. 1 is an elevation view of a brake constructed in accordance with the preferred embodiment of this invention.
Figure 2:
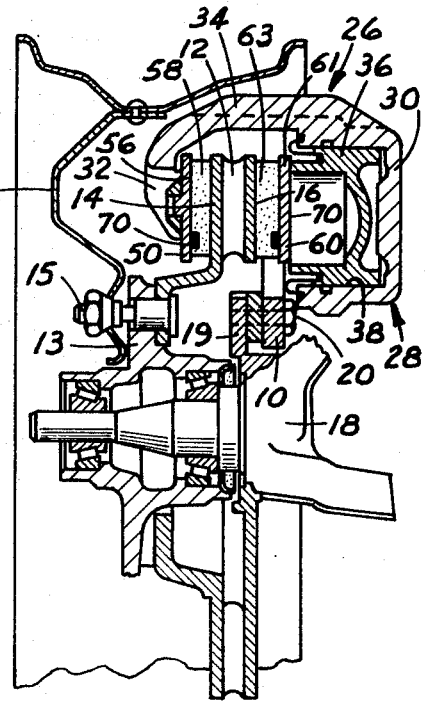
FIG. 2 is an enlarged fragmentary sectional view taken substantially along line 2—2 of FIG. 1 and further including a vehicle wheel.

Referring now to the drawings, and specifically FIGS. 1 and 2, there is illustrated a stationary support member 10 positioned along one side of a rotor 12, which is provided with annular opposed friction faces or surfaces 14 and 16. The rotor is connected to a wheel 11 and hub 13 by bolts 15. The stationary support member is attached to a fixed part of a vehicle, such as a spindle 18 having mounting bosses 19, by bolts 20 extending through the support member and bosses. The support member 10 has a pair of circumferentially spaced arms integral therewith for supporting a housing 26. The housing 26 then straddles the rotor and is slidably mounted on the stationary support member 10 for movement in an axial direction toward and away from said rotor. This mounting method is more fully explained in U.S. Pat. Nos. 3,388,774 and 3,410,371, and have in common with this invention the same assignee. The housing 26 comprises a portion 30 extending radially inwardly adjacent one side of said rotor and another portion 32 extending radially inwardly along the side of an adjacent to the other side of said rotor. The radial portions 30 and 32 are connected together by a bridge 34, thus providing a housing made from a single casting. An actuator 28 is located in the radial extending portion 30 and comprises a piston 36 slidably received in the bore 38. Appropriate seals are also provided to prevent escape of fluid from the chamber formed intermediate the piston 36 and the bore 38.

A friction element 50 is carried by the radial portion 32 of the housing 26 and lies adjacent one face of the rotor in contact therewith. The friction element 50, as shown herein, comprises a backing plate 56 and a friction lining 58.

The stationary support member 10, which takes the braking torque, slidably supports a friction element 60 between circumferentially spaced arms, not shown, for frictional engagement with a side of the rotor surface opposite to the siding gauge by the frictional element 50. The friction element 60 comprises a backing plate 61 and a friction lining 63.

The piston 36 of the actuator 28 is positioned adjacent the frictional element 60 for moving the friction element into frictional engagement with the rotor 12, upon energization of the fluid motor or actuator 28. The housing 26 floatingly straddles the rotor 12 in such a manner that piston 36 and friction elements 50 and 60 are in substantial axial alignment. The actuator 28 is operatively connected to the friction element 60 via the piston 36, and to the friction element 50 through the housing 26 so that the application of hydraulic pressure causes the friction elements 50 and 60 to grip the rotor 12, thereby effecting a braking application.

As may be seen then, friction linings 58 and 63 are in frictional engagement with surfaces 14 and 16 of the rotor 12 respectively during braking applications of the brake assembly. As best seen in FIG. 2, each of the friction linings 58 and 63 has a wear indicating means 70 imbedded therein. The wear indicator means 70 projects forward from the rear face of said lining a predetermined distance toward the front face for engagement with said rotor after said linings have worn a predetermined amount to the point where they need replacing. The wear indicator means 70, shown in FIG. 2, is comprised of a semi-solid marking substance placed in the back of the lining segment before it is fastened to its respective steel backing plate. The semi-solid marking substance is of such a texture as to not permanently scar the rotor when it engages said rotor after said predetermined amount of lining wear. The marking substance is designed such that when it contacts the disc or rotor it deposits a noticeable streak on the disc, such that upon visual inspection one would notice that the linings are worn to the point where they need replacing.

Figure 3:
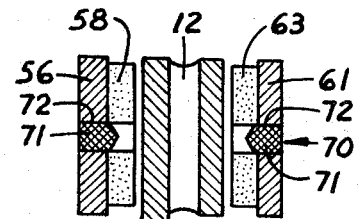
FIG. 3 is an enlarged fragmentary sectional view of a modified form of the invention shown in FIG. 2.
Figure 4:
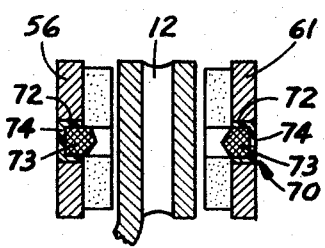
FIG. 4 is an enlarged fragmentary sectional view of a modified form of the invention shown in FIG. 2.
Figure 5:
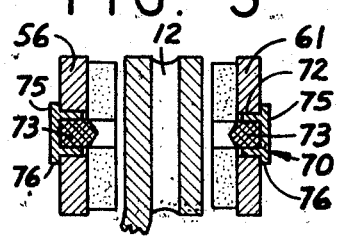
FIG. 5 is an enlarged fragmentary sectional view of a modified form of the invention shown in FIG. 2.

Referring now briefly to FIG. 3, the wear indicator means 70 is comprised of a plug of marking substance which is press fit into openings or holes 72 of the backing plates 56 and 61. It is noted that the ends of the plugs that face toward the rotor 12 may be conical in shape. The plugs after sufficient wearing of the linings 58 and 63 respectively, deposit first a narrow annular streak on the rotor 12, and as subsequent wear is experienced the streak becomes wider and wider until it approaches the diameter of said plug 71. With reference now to FIG. 4, said wear indicator means 70 may be comprised of a marking substance similar to the above-mentioned type, but substantially enclosed in a plastic plug 74 which, in turn, is press fit into openings or holes 72 of the backing plates of the friction members. FIG. 5 represents a modification of FIG. 4 wherein the wear indicator means 70 is comprised of a marking substance 73 suitably retained in a plug member 75 having a flange 76. The plug 74 is frictionally press fit into said opening 72 and flange 76 abuts the exterior surface of the backing plate. The flange 76 is an attempt to minimize any insertion error associated with the plug that could result from the embodiments shown in FIGS. 3 and 4. Specifically, the axial penetration toward the rotor by the plug 73 determines the point at which the marking substance begins to deposit a noticeable streak on the rotor 12. Thus, it is mandatory to control the predetermined distance between the marking end of the plug 73 and the rotor by controlling the axial penetration of said plug. The wear indicator means 70, as shown in FIGS. 3 and 4, have their predetermined axial distance between the marking ends of said means and the rotor established by controlling the exact overall length of said means and installing the back of said means flush with the rear surfaces of the respective backing plates.

DESCRIPTION OF THE MODIFIED EMBODIMENT

The structure of the modified embodiment, as shown in FIGS. 6 and 7, that is identical to that shown and described in the preferred embodiment will be given the same identifying numbers.

As may be seen best in FIGS. 7 and 8, the friction member 50 is suitably installed to cooperate with a wear indicator means 80 comprised of a pin means 81, a retainer means 82, a weight 83, and a flexible cord 84. The pin means 81 is comprised of a shaft portion 85 and a flange portion 86. The pin means 81 is carried by the lining backing plate 56 in opening 87. The lining 58 has a relieved portion with an interior surface 88 against which the flange portion 86 abuts. The overall length of the pin means 81 and distance between the interior surface 88 and the interior surface of the backing plate 56 are predetermined such that upon installation of pin means 81, the end 89 of shaft portion 85 is flush with the back surface 90 of the backing plate 56. As may be seen best in FIG. 6, the retainer means 82 is comprised of two or more resilient lever means 91 which protrude from back surface 90 of said friction member in a somewhat force opposing relationship to retain the weight 83 firmly against the end 89 of shaft portion 85. The lever means 91 may be rigidly secured to the backing plate 56 by spot welding, riveting, or other similar conventional techniques. Although said weight 83 is shown as a generally spherically shaped member it may be made in almost any physical configuration. The weight 83 has extending from one end a stem portion 92 with a hole 93, in which is fastened the flexible cord 84, whose other end is firmly attached to one of the lever means 91.

After substantial wear has been experienced by the brake lining 58, the rotor 12 will frictionally wear away surface 88 of said lining 58 so as to frictionally engage flange portion 86 of the pin means 81. Subsequent braking applications will wear additional lining from the lining 58 and exert an axial pressure on said pin means 81 so that the end 89 of shaft portion 85 will eventually disengage weight 83 from the retainer means 82. Upon disengagement of the weight 83 from the retainer means 82, the weight being attached by the flexible cord 84 to the retainer means 82 will engage or rattle against said wheel 11 as it turns, thus giving an audible indication to the operator of the vehicle that his brake shoe linings are worn to the point where they need replacement. As will be seen from the drawings the weight 83 will continue to engage the wheel 11 as long as the vehicle is in motion. It is also noted that during periods when the vehicle is not being operated, it may be seen by visual inspection that the weight 83 has been disengaged from the retainer means 82 and thus the person inspecting said vehicle will be advised that the brake shoe linings are worn to the point where they need replacement.

Obviously, then, many modifications and variations of the present invention are possible in light of the above teachings; therefore it is intended to cover all changes and modifications of the embodiment set forth herein which do not constitute departures from the spirit and scope of the invention.

I claim:

1. A brake assembly having a brake lining wear indicator comprising:
   a member to be braked;
   a friction member having a lining for engagement with said member to be braked to effect a brake application;
   a wear indicator means projecting from the rear face of said lining a predetermined distance toward the front face for engagement with said member to be braked after a predetermined amount of lining wear;
   said wear indicator means being of a construction so as to not permanently scar the member to be braked when in engagement therewith;
   said wear indicator means giving a warning upon said predetermined amount of lining wear;
   said wear indicating means comprising a pin means slidably carried by said friction member, a retainer means rigidly secured to said friction member, and a weight releasably carried in said retainer means and abutting said pin means;
   said pin means being responsive to engagement with said member to be braked after a predetermined amount of lining wear to release said weight from said retainer means so as to allow said weight to engage said brake assembly and thus give an audible signal of the worn lining condition.

2. A wear indicator means as recited in claim 1 and further including a flexible cord of predetermined length secured on one end to said weight and on the other end to said retainer means.

3. A wear indicator means as recited in claim 1, wherein said pin means has a flange which is captively retained intermediate said friction member and said lining.

4. A wear indicator means as recited in claim 1, wherein said weight is generally spherical in shape.

5. A wear indicator means as recited in claim 1, wherein said retainer means comprises two or more resilient lever means, protruding from said friction member and positioned in a force-opposing relationship.

* * * * *